March 10, 1925.  G. F. BROZ  1,529,238
JOINT AERATOR
Filed Nov. 14, 1923
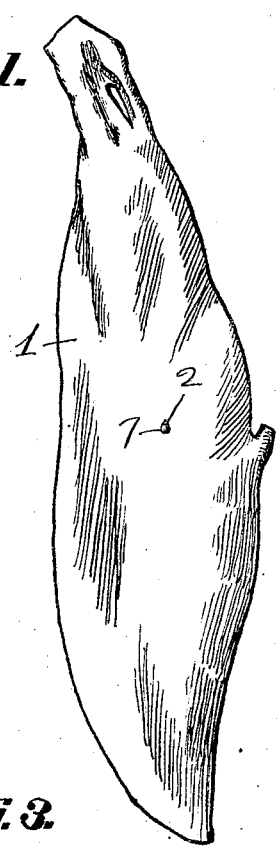
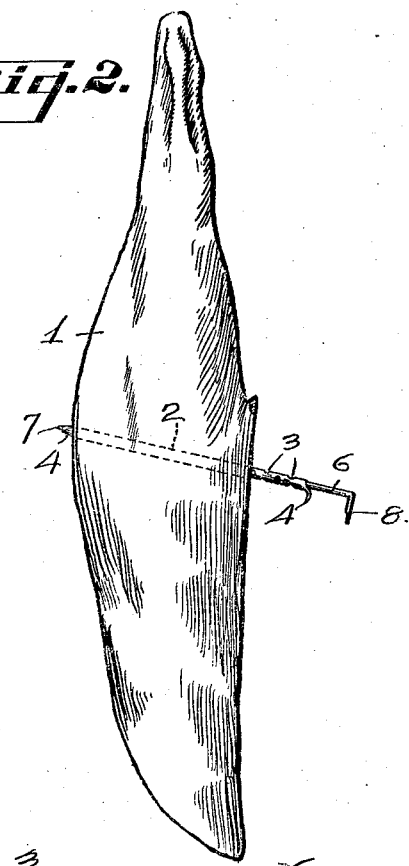
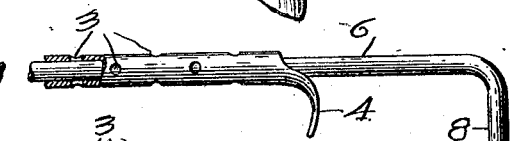
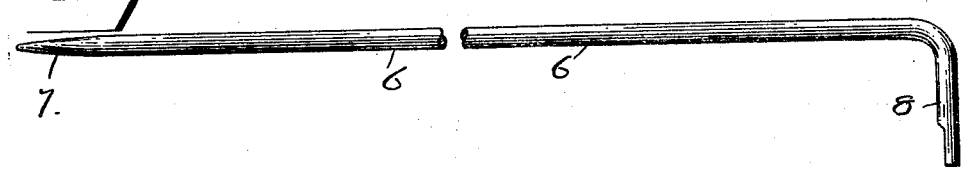
INVENTOR
George F. Broz.
BY Arthur L. Slee
ATTY Patented Mar. 10, 1925.

1,529,238

UNITED STATES PATENT OFFICE.

GEORGE F. BROZ, OF HONOLULU, TERRITORY OF HAWAII.

JOINT AERATOR.

Application filed November 14, 1923. Serial No. 674,713.

*To all whom it may concern:*

Be it known that I, GEORGE F. BROZ, a citizen of the United States, residing in the city and county of Honolulu, in the Territory of Hawaii, have invented a new and useful Improvement in a Joint Aerator, of which the following is a specification.

My invention relates to improvements in skewers wherein a perforated tube operates in conjunction with a pointed rod arranged to be inserted therein to form a skewer to be inserted within a joint of beef or the like, to aerate said joint to prevent souring of the same.

The primary object of the present invention is to provide a new and improved skewer arranged to thoroughly aerate the joint and the inner portion of the thicker portion of a hind quarter of beef, to prevent souring thereof.

Another object of the present invention is to provide a new and improved skewer of the character described which may be easily inserted within a joint of beef to aerate the same.

A further object of the present invention is to provide a new and improved device of the type set forth having means for retaining an open channel through a joint of beef in order to permit the free and unobstructed passage of air therethrough to facilitate the passage of animal heat from said joint.

I accomplish these and other objects by means of the improved device described in the drawings forming a part of the present specification, wherein like characters of reference are used to designate similar parts throughout the said specification and drawings, and in which—

Fig. 1 is a representation of a hind-quarter of beef disclosing my invention applied thereto;

Fig. 2 is a side elevation of Figure 1 disclosing the skewer inserted through the thicker portion of the beef;

Fig. 3 is an enlarged, broken view, partly in section, disclosing the invention assembled for insertion through the joint;

Fig. 4 is an enlarged broken view of the skewer in operative position, but removed from the joint; and Fig. 5 is a broken view of the inner skewer or means for facilitating the insertion of the invention into the joint.

Referring to the drawings the numeral 1 is used to designate in general a hind-quarter of beef dressed for the market. After dressing the beef the several quarters are moved into and stored, for a period, within a suitable refrigerator, whereby the animal heat may be removed from the meat for preservation purposes.

The joint where the rear or hind leg is jointed to the pelvis is the thicker portion of the meat and long after other portions have cooled and the animal heat has been removed or radiated therefrom this inner portion around the joint is still warm and contains considerable portion of animal heat. Unless this heat is thoroughly and completely removed from the beef what is known to the trade as "sour joint" results and the meat is spoiled.

In order to facilitate the removal of this heat from the joint and expose the same more readily to the surrounding atmopshere I have invented what I term a joint aerator which consists principally of a tube 2 provided with perforations or apertures 3 throughout, substantially, the entire length of said tube 2. One end of the tube 2 is tapered as at 3 while the opposite end is provided with a lateral extension 4, the purpose of which will hereinafter be more fully set forth.

Adapted for insertion within the tube 2 and arranged to fit snugly therein is an inner skewer or rod 6 having a sharp point 7 at one end which point 7 is arranged to operate in conjunction with the tapered portion 3 of the tube 2, by projecting slightly beyond said tapered end 3 thereof, to form a point by means of which the assembled tube and rod may be easily and readily inserted into or passed through a hind-quarter of beef 1 as disclosed in Figs. 1 and 2 of the drawings.

The opposite end of the rod 6 is provided with a lateral extension 8 to serve as a handle which, when held in the hand of the operator, will operate in conjunction with the lateral extension 4 of the tube 2 to retain said rod 6 within the tube 2 while they are being inserted into or passed through the beef 1.

By grasping the lateral extension 8 in the palm of the hand and pulling with the fingers upon the lateral extension 4 of the tube 2 the said rod 6 is retained in operative position, that is, with the point 7 of said rod 6 extending beyond the tapered end 3 of the tube 2. The inner surface of the tapered end 3 of the tube 2 engages a portion of the pointed end 7 of the rod 6 and prevents said rod 6 from being pushed through the said tube 2.

By this means the tube 2 and rod 6 are held tightly in operative position to facilitate introduction of the device into the meat.

After the tube 2 and rod 6 have been passed through the joint 1 the rod 6 is withdrawn by means of the lateral extension 8 thereof, and during the withdrawal process the tube 2 is prevented from being withdrawn by grasping the lateral extension 4 thereof.

After the rod 6 has been withdrawn the tube 2 is left within the beef 1 thereby permitting the unobstructed passage of air therethrough to facilitate the removal of animal heat whereby said joint may be cooled with the remaining portion of the hindquarter 1.

The perforations 3 of the tube 2 will permit inner portions of the beef 1 and joint thereof to be reached by the surrounding atmosphere and at the same time facilitate the removal of any surplus blood which might remain within the beef, which blood will be readily drained through the tube 2 by means of the inclination thereof as disclosed in Fig. 2 of the drawings.

After the joint has been properly cooled and drained the tube 2 may be readily withdrawn by grasping the lateral extension 4 thereof and pulling outwardly upon said tube 2.

It is obvious from the foregoing that I have provided a new and improved device for properly aerating the joint of a hindquarter of beef whereby sour joint and the loss of the meat may be prevented.

Having thus described my invention what I claim as new and desire to secure by Letters Patent is—

1. A joint aerator comprising a perforated tube; and means arranged for insertion within said tube for facilitating the introduction of said tube into a joint whereby said joint may be aerated.

2. A joint aerator comprising a perforated tube having a lateral extension at one end thereof to facilitate withdrawal of said tube from a joint, the other end of said tube being tapered; and a pointed rod arranged to be inserted within said tube with the pointed and projecting from the tapered end of said tube to form a point therewith to facilitate insertion of said tube within a joint, said rod being provided with a lateral extension opposite the pointed end to facilitate withdrawal of said rod after the tube has been inserted within a joint.

In witness whereof I hereunto set my signature.

GEORGE F. BROZ.